(12) United States Patent
Chopra et al.

(10) Patent No.: US 8,613,507 B2
(45) Date of Patent: Dec. 24, 2013

(54) CURABLE PHASE CHANGE INKS CONTAINING FUNCTIONALIZED ISOSORBIDES

(75) Inventors: Naveen Chopra, Oakville (CA); Guerino Sacripante, Oakville (CA); Michelle N. Chretien, Mississauga (CA); Barkev Keoshkerian, Thornhill (CA)

(73) Assignee: Xerox Corporation, Norwalk, CT (US)

( * ) Notice: Subject to any disclaimer, the term of this patent is extended or adjusted under 35 U.S.C. 154(b) by 485 days.

(21) Appl. No.: 12/906,679

(22) Filed: Oct. 18, 2010

(65) Prior Publication Data

US 2012/0092426 A1     Apr. 19, 2012

(51) Int. Cl.
    *B41J 2/01*     (2006.01)
(52) U.S. Cl.
    USPC .............................................. 347/99; 347/88
(58) Field of Classification Search
    USPC ................ 347/88, 99, 102; 106/31.29–31.31, 106/31.61–31.63; 523/160, 161
    See application file for complete search history.

(56) References Cited

U.S. PATENT DOCUMENTS

| | | | |
|---|---|---|---|
| 5,231,135 A | 7/1993 | Machell et al. | |
| 5,389,958 A | 2/1995 | Bui et al. | |
| 5,621,022 A | 4/1997 | Jaeger et al. | |
| 5,977,209 A * | 11/1999 | Breton et al. | 523/160 |
| 6,180,691 B1 * | 1/2001 | Cheng et al. | 523/160 |
| 6,184,268 B1 * | 2/2001 | Nichols et al. | 523/160 |
| 6,221,137 B1 | 4/2001 | King et al. | |
| 6,472,523 B1 | 10/2002 | Banning et al. | |
| 6,476,219 B1 | 11/2002 | Duff et al. | |
| 6,548,571 B1 * | 4/2003 | Cheng et al. | 523/160 |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| H2113 H * | 1/2005 | Nichols et al. | 523/160 |
| 6,958,406 B2 | 10/2005 | Banning et al. | |
| 7,053,227 B2 | 5/2006 | Jaeger et al. | |
| 7,276,614 B2 | 10/2007 | Toma et al. | |
| 7,279,587 B2 | 10/2007 | Odell et al. | |
| 7,311,948 B2 | 12/2007 | Lub et al. | |
| 7,381,831 B1 | 6/2008 | Banning et al. | |
| 7,427,323 B1 | 9/2008 | Birau et al. | |
| 7,438,832 B2 * | 10/2008 | Majumdar et al. | 252/500 |
| 2006/0119686 A1 | 6/2006 | Odell | |
| 2006/0158496 A1 | 7/2006 | Odell et al. | |
| 2007/0120921 A1 | 5/2007 | Carlini et al. | |
| 2007/0120924 A1 | 5/2007 | Odell et al. | |
| 2007/0185224 A1 * | 8/2007 | Akiyama et al. | 522/6 |
| 2008/0000384 A1 * | 1/2008 | Belelie et al. | 106/31.13 |
| 2008/0122914 A1 | 5/2008 | Toma et al. | |
| 2009/0018300 A1 | 1/2009 | Bloom et al. | |
| 2009/0259057 A1 | 10/2009 | Schreck et al. | |
| 2011/0135853 A1 * | 6/2011 | Tiller et al. | 428/29 |
| 2011/0315049 A1 * | 12/2011 | Aoki et al. | 106/31.86 |
| 2012/0035317 A1 * | 2/2012 | Roberts et al. | 524/591 |
| 2012/0040287 A1 * | 2/2012 | Wang et al. | 430/125.32 |
| 2013/0032056 A1 * | 2/2013 | Goredema et al. | 106/31.29 |

OTHER PUBLICATIONS

Gloss in hot melt inks, Aug. 2006, RD 508064.*
Fleche et al., "Isosorbide", Starch/Starke, vol. 38, pp. 26-30, (1986).
U.S. Appl. No. 12/474,946, filed May 29, 2009.
"Dimer Acids," Kirk-Othmer Encyclopedia of Chemical Technology, vol. 8, 4$^{th}$ Ed. (1992), pp. 223 to 237.
M. Jaffe et al., "Corn (Sugars) Based PolymerChemistries for the Plastics Industry", Medical Device Concept Laboratory, Department of Biomedical Engineering, pp. 1-32, Jun. 2006.
"Roquette", BioPerspectives 2005—BREW Symposium—Wiesbaden—May 11, 2005.

* cited by examiner

*Primary Examiner* — Matthew Luu
*Assistant Examiner* — Rut Patel
(74) *Attorney, Agent, or Firm* — Oliff & Berridge, PLC

(57) ABSTRACT

A curable phase change ink composition that includes an ink vehicle including at least one isosorbide monomer having at least one functional group. Also described is an ink printing device that includes a curable phase change ink composition for printing onto a substrate, an ink jetting device, and a curing device providing radiation that cures the curable phase change ink composition. The curable phase change ink composition of the ink printing device includes an ink vehicle including at least one isosorbide monomer having at least one functional group.

19 Claims, No Drawings

CURABLE PHASE CHANGE INKS CONTAINING FUNCTIONALIZED ISOSORBIDES

BACKGROUND

This disclosure is generally directed to curable phase change inks, such as radiation-curable phase change inks, and their use in forming images, such as through inkjet printing. More specifically, this disclosure is directed to radiation-curable phase change inks, such as ultraviolet-light-curable phase change inks, that comprise at least one isosorbide monomer having at least one functional group.

Inkjet printing systems are known in the art, and thus extensive description of such devices is not required herein. Phase change or "hot melt" inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, plastic, cardboard, and the like), the droplets solidify quickly upon contact with the substrate, so that migration of ink along the printing medium is substantially prevented and dot quality is improved.

Curable phase change inks typically contain a curable monomer that serves as a reactive diluent and is often the major component (50 to about 55 percent by weight) of the curable phase change ink composition. Examples of curable monomers include diacrylate molecules derived from petroleum-based diols, such as propoxylated neopentyl glycol diacrylate. However, curable phase change inks may also cause certain problems such as (1) increased accumulation in greenhouse gases and/or accumulation of non-biodegradable materials and (2) ink shrinkage (the purging of excess ink) caused by formation of air bubbles jet lines. These issues may be due to presence of the petroleum based curable monomers in the curable phase change ink, which can lead to poor abrasian resistance, poor adhesion and poor offset.

SUMMARY

What is still desired is a curable phase change ink containing a compound that reduces or eliminates the amount of petroleum-based products, such as curable monomers, in the curable phase change ink, increases abrasion resistance and/or adhesion and reduces the accumulation of greenhouse gases and/or non-biodegradable materials. Such a curable phase change ink would thus be suitable for all processes and/or devices using solid inks.

The above and other issues are addressed by the present application, wherein in embodiments, the application relates to a curable phase change ink composition, the ink composition comprising an ink vehicle and at least one isosorbide monomer having at least one functional group.

In embodiments, described is a curable phase change ink composition, the ink composition comprising an ink vehicle including at least one isosorbide monomer having at least one functional group and at least one colorant.

In embodiments, described is an ink printing device comprising: a curable phase change ink composition for printing onto a substrate, an ink jetting device, and a curing device providing radiation that cures the curable phase change ink composition, wherein the curable phase change ink composition comprises an ink vehicle comprising at least one isosorbide monomer having at least one functional group.

EMBODIMENTS

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include acrylates, methacrylates, fatty acids having from about 4 to about 20 carbon atoms, alkenes, allylic ethers, epoxides and oxetanes.

The term "long-chain" refers, for example, to hydrocarbon chains $(CH_2)_n$ in which n represents the number of carbon atoms in the chain and wherein n is a number of from about 8 to about 60, such as from about 20 to about 45 or from about 30 to about 40. The term "short-chain" refers, for example, to hydrocarbon chains in which n represents the number of carbon atoms in the chain and wherein n is a number of from 1 to about 7, such as from about 2 to about 5 or from about 3 to about 4.

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing techniques include curing using ultraviolet (UV) light, for example having a wavelength of 200-400 nm or, curing using visible light, optionally in the presence of photoinitiators and/or sensitizers, curing using electron-beam radiation, optionally in the absence of photoinitiators, curing using thermal curing, in the presence or absence of high-temperature thermal initiators (and which may be largely inactive at the jetting temperature), and appropriate combinations thereof.

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the operator to the motor applies the shear strain, and the sample deformation (torque) is measured by the transducer. Examples of such instruments are the Rheometrics Fluid Rheometer RFS3 or the ARES mechanical spectrometer, both made by Rheometrics, a division of TA Instruments. Alternatively, a controlled-stress instrument, where the shear stress is applied and the resultant strain is measured, may be used. Examples of such instruments are the majority of the current rheometers, the main manufacturers being Anton Parr GmbH, Bohlin Instruments, a division of Malvern Instruments, ATS Rheosystems and TA Instruments. Such a rheometer provides a periodic measurement of viscosity at various plate rotation frequencies, ω, rather than the transient measurement of, for instance, a capillary viscometer. The reciprocating plate rheometer is able to measure both the in phase and out of phase fluid response to stress or displacement. The complex viscosity, $\eta^*$, is defined as $\eta^* = \eta' - i\eta''$; where $\eta' = G''/\omega$, $\eta'' = G'/\omega$ and i is $\sqrt{-1}$. Alternatively a viscometer that can measure only the transient measurement of, for instance, a capillary or shear viscosity, such as those made by Brookfield Engineering Laboratories or Cannon Instrument Company can also be used.

"Optional" or "optionally" refer, for example, to instances in which the subsequently described circumstance may or may not occur, and include instances in which the circumstance occurs and instances in which the circumstance does not occur.

As used herein, the term "ink vehicle" refers to all components within the curable phase change ink composition except the colorant, such as, for example, the isosorbide monomer functionalized with at least one functional group, the curable wax, additional curable monomer, etc.

The terms "one or more" and "at least one" refer, for example, to instances in which one of the subsequently described circumstances occurs, and to instances in which more than one of the subsequently described circumstances occurs.

Exemplary ink compositions provide superior print quality while meeting requirements of piezoelectric ink-jet printing processes. An exemplary ink composition includes an ink vehicle including at least one isosorbide monomer having at least one functional group. In particular, exemplary ink compositions comprise an ink vehicle that includes a curable wax, a gellant, and at least one isosorbide monomer having at least one functional group. Additional exemplary ink compositions comprise an ink vehicle that comprises two or more chemically distinct curable gellants. Exemplary methods of preparing such ink compositions and exemplary methods of using such ink compositions are also described.

In embodiments, the curable phase change ink is a gel at room temperature, or the gel can be realized as the ink composition cools after being jetted onto the substrate at the jetting temperature. The curable phase change ink may also be a solid at room temperature.

When the ink compositions described herein are in the gel state, the viscosity of the ink composition is at least about 1,000 mPa·s, such as at least about 10,000 mPa·s, or at least about 100,000 mPa·s. The viscosity values in the gel state of exemplary ink compositions may be in the range of from about $10^3$ to about $10^9$ mPa·s, such as from about $10^{4.5}$ to about $10^{6.5}$ mPa·s. Gel-phase viscosity can vary with the print process. For example, the highest viscosities may be suitable for use in embodiments that employ intermediate transfer, or when jetting directly to porous paper in order to minimize the effects of ink bleed and feathering. On the other hand, less porous substrates, such as plastic, may require lower viscosities that control dot gain and agglomeration of individual ink pixels. The gel viscosity can be controlled by ink formulation and substrate temperature.

The curable phase change ink desirably has a viscosity of less than about 15 mPa·s, such as less than about 12 mPa·s, for example from about 3 to about 12 mPa·s, such as from about 5 to about 10 mPa·s, at the temperature of jetting. The ink compositions may be jetted at temperatures of less than about 110° C., such as from about 40° C. to about 100° C., or from about 55° C. to about 90° C., such as from about 60° C. to about 90° C., or from about 70° C. to about 90° C. Furthermore, the curable phase change ink may have an elastic modulus (G') at room temperature of from about 400 Pa to about 2000 Pa, such as from about 400 Pa to about 1500 Pa and from about 400 Pa to about 1000 Pa. The cohesion of curable phase change ink is represented by the elastic modulus at room temperature.

Described herein is a curable phase change ink composition that includes an ink vehicle containing at least one isosorbide monomer having at least one functional group.

Isosorbide Monomer Having a Functional Group

The ink vehicle includes at least one isosorbide monomer having at least one functional group. The at least one functional group may be an acrylate; a methacrylate; a fatty acid having from about 4 to about 20 carbon atoms, from about 5 to about 16 carbon atoms, from about 8 to about 12 carbon atoms; an alkene; an allylic ether; an epoxide and an oxetane. Examples of suitable isosorbides include those described in U.S. Patent Application Pub. No. 2009/0018300. Furthermore, the isosorbide monomer may also have two or more functional groups.

The at least one isosorbide monomer having at least one functional group may also be represented by the formula (I)

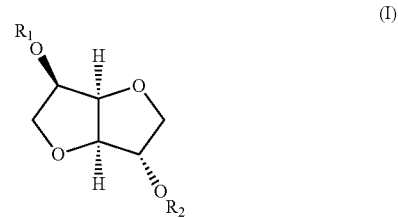

wherein $R_1$ represents a hydrogen atom or the at least one functional group, $R_2$ represent a hydrogen atom or the at least one functional group, and $R_1$ and $R_2$ are not both hydrogen atoms. As shown below in Formula (II), isosorbide that is not functionalized possesses (1) a V-shaped chemical structure due to the two fused tetrahydrofuran rings and (2) two hydroxyl (—OH) functional groups having a different reactivity.

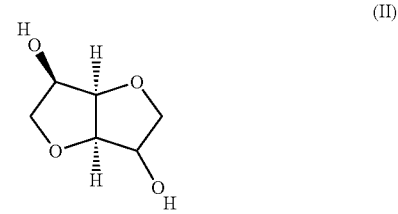

The isosorbide monomer described herein are thus functionalized at the hydroxyl groups on the tetrahydrofuran rings of the isosorbide compound.

Isosorbide may be obtained via the dehydration of sorbitol through an acid catalyzed reaction. As described in Fleche, et al., *Isosorbide*, Starch/Starke, vol. 38, 1986, pp. 26-30, the reaction mechanism for formation of isosorbide is

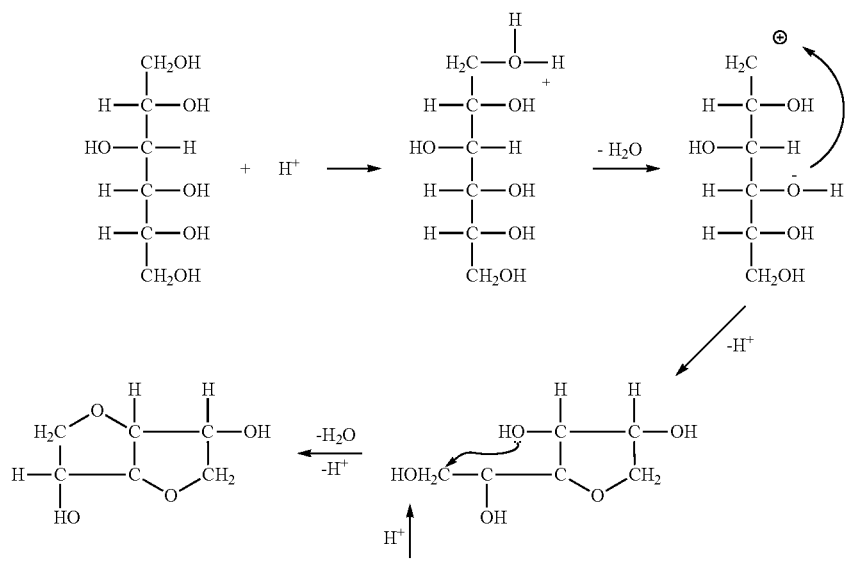

As shown above, although theoretically each hydroxyl group on the sorbitol may be protonated, protonation most often occurs on the primary hydroxyl group causing a molecule of water to be eliminated and resulting in the formation of 1,4 monoanhydrosorbitol via the cyclization of the carbon atoms at the C1 and C4 positions. This step may be repeated with the protonation the remaining primary hydroxyl group at the C6 position, followed by the cyclization, which results in a second ring between the carbons atoms at the C3 and C6 positions.

a reaction vessel is loaded with a high purity aqueous solution of sorbitol (the D-sorbitol content being greater than 99%). Other methods of preparing isosorbide are described in U.S. Patent Application Pub. No. 2009/0259057, the disclosure of which is incorporated by reference herein in its entirety.

An isosorbide monomer functionalized with two acrylate functional groups may be formed in the manner illustrated in the below reaction scheme.

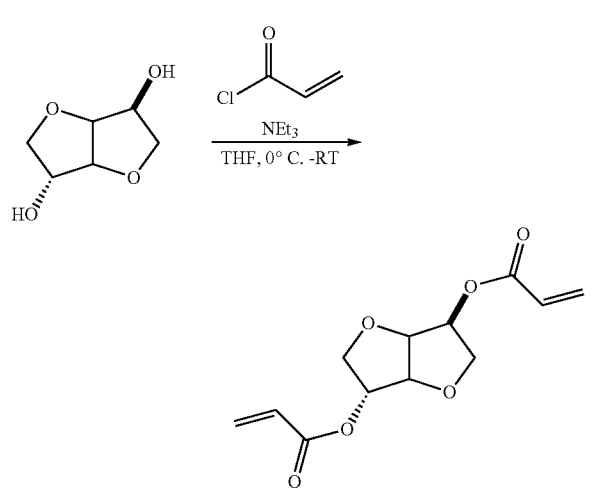

As shown above, the functionalized isosorbide monomer may be formed by dissolving an amount of isosorbide in a solvent, such as tetrahydrofuran (THF), toluene, dichloromethane or dimethylformamide (DMF). After cooling the solution to a temperature of about 0° C., an acrylic moiety compound, such as acryloyl chloride, may be added to form a precipitate. After evaporating the solvent in vacuo and washing the precipitate, isosorbide diacrylate may be formed.

An isosorbide monomer functionalized with two acrylate functional groups may be formed in the manner illustrated in the below reaction scheme.

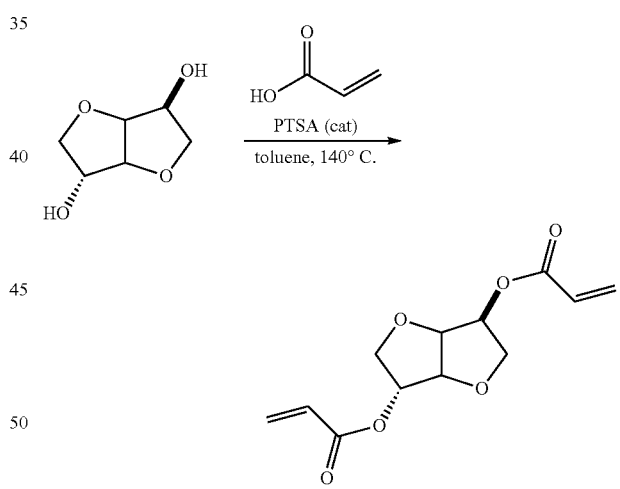

As shown above, the functionalized isosorbide monomer may be prepared using an acid catalyzed mechanism. The acid catalyzed mechanism begins by dissolving an amount of isosorbide in a solvent such, as toluene, with a catalytic amount of acid (such as a p-toluene sulfonic acid (PTSA)), and heating the reaction to reflux at 140° C. while slowly adding an amount of acrylic acid dropwise. The reaction proceeds smoothly to furnish the isosorbide diacrylate product.

The isosorbide monomer functionalized with at least one functional group may be present in the curable phase change ink composition in amount ranging from about 0.01% to about 80% by weight, such as from about 1% to about 75% weight, from about 10% to about 70% by weight, from about 25% to about 60% by weight, from about 40% to about 60% by weight, from about 40% to about 55% by weight, and from about 40% to about 50% by weight, relative to the total weight of the ink composition.

Additional Curable Monomers

In embodiments, the ink vehicle of the curable phase change ink composition further includes at least a gellant, at least a curable wax and an optional photoinitiator. The curable phase change ink compositions may also include an additional curable monomer besides the isosorbide monomer functionalized with at least one curable group. However, the additional curable monomer is present in the curable phase change ink composition in an amount that is substantially less than isosorbide, such as about 50% to about 300% less, about 75% to about 200% less, 100% to about 150% less, by weight of the curable phase change ink composition. Furthermore, the isosorbide monomer having at least one functional group desirably substantially or entirely replaces the additional curable monomer(s) in the ink composition. If more than one additional curable liquid monomer is present in the curable phase change ink, the additional curable liquid monomers are referred to "co-monomers". The co-monomers may be chosen from any suitable additional curable monomers except the isosorbide monomers.

Ink compositions herein may comprise a first co-monomer, due to the solubility and gelling properties of gellant materials, such as, epoxy-polyamide composite gellants, which are useful for producing ink compositions including an ink vehicle having a thermally-driven and reversible gel phase, where the ink vehicle is comprised of curable liquid monomers, such as UV-curable liquid monomers. The gel phase of such ink compositions allows an ink droplet to be pinned to a receiving substrate.

Examples of the optional additional curable monomer of the curable phase change ink composition include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl(meth)acrylate, tricyclodecane dimethanol diacrylate, dioxane glycol diacrylate, butane dioldiacrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the composition. Examples of suitable curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris(2-hydroxy ethyl)isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR399LV and SR 494), and the like.

Additional examples of the additional curable monomers include acrylated esters, acrylated polyesters, acrylated ethers, acrylated polyethers, acrylated epoxies, urethane acrylates, and pentaerythritol tetraacrylate. Specific examples of suitable acrylated oligomers include, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like; acrylated urethane oligomers, such as EB270 (UCB Chemicals), EB 5129 (Cytec Surface Specialties), CN2920 (Sartomer Co.), CN3211 (Sartomer Co.), and the like; and acrylated epoxy oligomers, such as EB 600 (Cytec Surface Specialties), EB 3411 (Cytec Surface Specialties), CN2204 (Sartomer Co.), CN110 (Sartomer Co.), and the like.

The additional curable monomer may be chosen from short-chain alkyl glycol diacrylates or ether diacrylates, such as propoxylated neopentyl glycol diacrylate, and the non-fluorescent co-monomer may be chosen from acrylates having short-chain alkyl ester substituents, such as caprolactone acrylate, and the commercially available products CD536, CD 2777, CD585 and CD586 (available from Sartomer Co. Inc.).

In addition, the additional curable monomer or oligomer may variously function as a viscosity reducer, as a binder when the composition is cured, as an adhesion promoter, as a reactive diluent and as a crosslinking agent that can increase the crosslink density of the cured image, thereby enhancing the toughness of the cured images. The curable monomer may also be used as a dispersion liquid for the one or more colorants. Suitable monomers may have a low molecular weight, low viscosity, and low surface tension and comprise functional groups that undergo polymerization upon exposure to radiation such as UV light.

The curable phase change ink compositions may include one or more co-monomers in an amount ranging from about 0.1% to about 30% by weight, such as from about 0.5% to about 25% by weight, from about 1% to about 20%, from about 1% to about 10%, or from about 1% to about 5% by weight, relative to the total weight of the ink composition.

Curable Gellants

The curable phase change ink composition may include at least one gellant.

The organic gellants function to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink formulation. Mixtures of one or more gellants may be used to effect the phase change transition.

The phase change nature of the gellant can thus be used to cause a rapid viscosity increase in the jetted ink composition upon the substrate following jetting of the ink to the substrate. In particular, jetted ink droplets would be pinned into position on a receiving substrate, such as an image-receiving medium (for instance, paper), that is at a temperature cooler than the ink jetting temperature of the ink composition through the action of a phase change transition in which the ink composition undergoes a significant viscosity change from a liquid state to a gel state (or semi-solid state).

In embodiments, the temperature at which the ink composition forms the gel state is any temperature below the jetting temperature of the ink composition, for example any temperature that is about 10° C. or more below the jetting temperature of the ink composition. The gel state may be formed at temperatures from about from about 20° C. to about 85° C., such as from about 30° C. to about 80° C., from about 40° C. to about 75° C., from about 45° C. to about 65° C., or from about 40° C. to about 50° C., such as about 45° C. There is a rapid and large increase in ink viscosity upon cooling from the jetting temperature at which the ink composition is in a liquid state, to the gel transition temperature, at which the ink composition converts to the gel state.

A suitable gellant for the ink composition would gel the monomers/oligomers in the ink vehicle quickly and reversibly, and demonstrate a narrow phase change transition, for example within a temperature range of about 20° C. to about 85° C. The gel state of exemplary ink compositions should exhibit a minimum of $10^{2.5}$ mPa·s, such as $10^3$ mPa·s, increase in viscosity at substrate temperatures, for instance, from about 30° C. to about 70° C., compared to the viscosity at the jetting temperature. The gellant-containing ink compositions rapidly increase in viscosity within 5° C. to 10° C. below the jetting temperature and ultimately reach a viscosity above $10^4$ times the jetting viscosity, for example about $10^5$ times the jetting viscosity.

Gellants suitable for use in the ink compositions include a curable gellant comprised of a curable amide, a curable polyamide-epoxy acrylate component and a polyamide component, a curable composite gellant comprised of a curable epoxy resin and a polyamide resin, mixtures thereof and the like, as disclosed in U.S. Patent application Ser. No. 12/474,946, which is hereby incorporated herein by reference in its entirety. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate, such as paper, can lead to an undesirable decrease in the substrate opacity. The curable gellant may also participate in the curing of monomer(s) of the composition.

The gellants suitable for use in the composition may be amphiphilic in nature in order to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Patent Application Publication Nos. 2008/0122914 and U.S. Pat. Nos. 7,276,614 and 7,279,587, the entire disclosures of which are incorporated herein by reference.

As described in U.S. Pat. No. 7,279,587, the amide gellant may be a compound of the formula

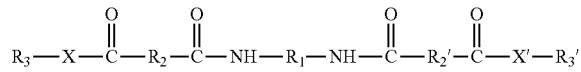

wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups can be halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:
(i) alkylene groups having from about 1 carbon atom to about 54 carbon atoms, such as from about 1 carbon atom to about 48 carbon atoms or from about 1 carbon atom to about 36 carbon atoms,
(ii) arylene groups having from about 5 carbon atoms to about 15 carbon atoms, such as from about 5 carbon atoms to about 13 carbon atoms or from about 5 carbon atoms to about 10 carbon atoms,
(iii) arylalkylene groups having from about 6 carbon atoms to about 32 carbon atoms, such as from about 7 carbon atoms to about 33 carbon atoms or from about 8 carbon atoms to about 15 carbon atoms, or
(iv) alkylarylene groups having from about 6 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:
(a) photoinitiating groups, such as groups derived from 1-(4-(2-hydroxyethoxy)phenyl)-2-hydroxy-2-methylpropan-1-one, of the formula

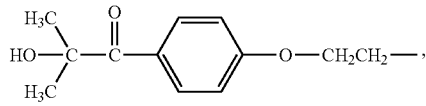

groups derived from 1-hydroxycyclohexylphenylketone, of the formula

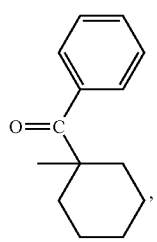

groups derived from 2-hydroxy-2-methyl-1-phenylpropan-1-one, of the formula

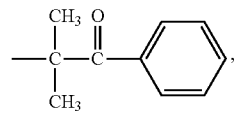

groups derived from N,N-dimethylethanolamine or N,N-dimethylethylenediamine, of the formula

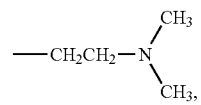

or the like, or:
(b) a group which is:
(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms,
(ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like,
(iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or
(iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring;
and X and X' each, independently of the other, is an oxygen atom or a group of the formula —$NR_4$—, wherein $R_4$ is:
(i) a hydrogen atom;
(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms,
(iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms,
(iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or
(v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference in their entireties, and thus are not further detailed herein.

The gellant may comprise a mixture comprising:

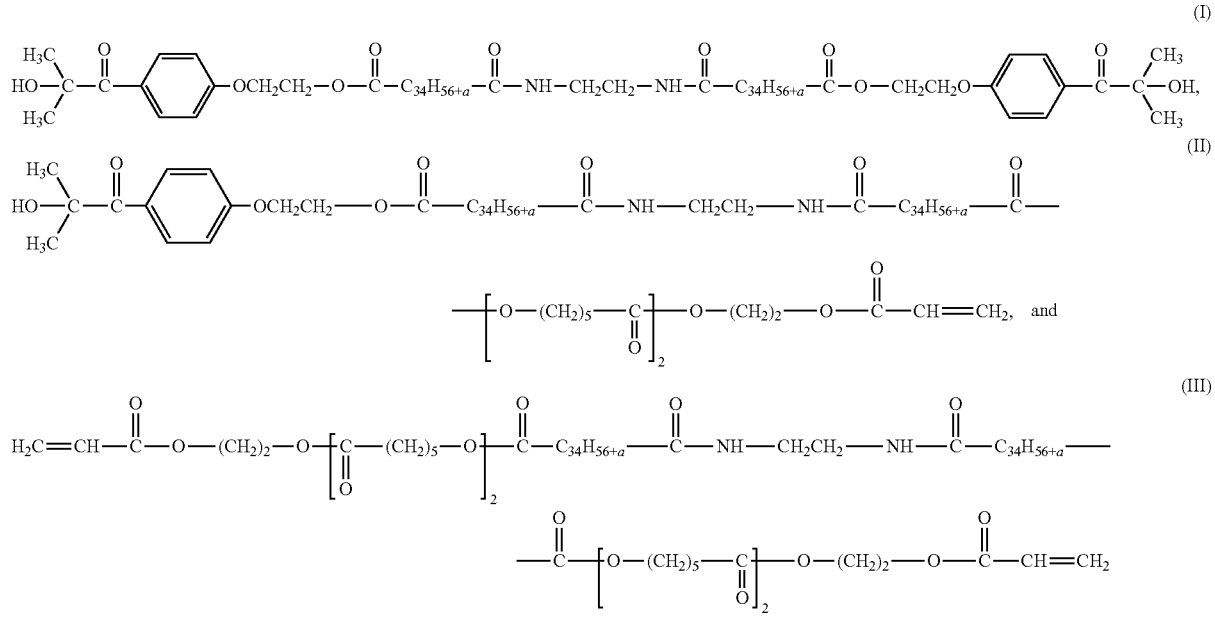

wherein —$C_{34}H_{56+a}$— represents a branched alkylene group which may include unsaturations and cyclic groups, wherein the variable "a" is an integer from 0-12.

In embodiments, the gellant may be a composite gellant, for example comprised of a curable epoxy resin and a polyamide resin. Suitable composite gellants are described in commonly assigned U.S. Patent Application Publication No. 2007/0120921, the entire disclosure of which is incorporated herein by reference.

The epoxy resin component in the composite gellant can be any suitable epoxy group-containing material. The epoxy group containing component includes the diglycidyl ethers of either polyphenol-based epoxy resin or a polyol-based epoxy resin, or mixtures thereof. That is, the epoxy resin has two epoxy functional groups that are located at the terminal ends of the molecule. The polyphenol-based epoxy resin is a bisphenol A-co-epichlorohydrin resin with not more than two glycidyl ether terminal groups. The polyol-based epoxy resin can be a dipropylene glycol-co-epichlorohydrin resin with not more than two glycidyl ether terminal groups. Suitable epoxy resins have a weight average molecular weight in the range of from about 200 to about 800, such as from about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth) acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used. The polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, such as a diamine (for example, alkylenediamines such as ethylenediamine, DYTEK® series diamines, poly(alkyleneoxy)diamines, and the like), or also copolymers of polyamides such as polyester-polyamides and polyether-polyamides. One or more polyamide resins may be used in the formation of the gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are described as polyalkyleneoxydiamine polyamides with the general formula,

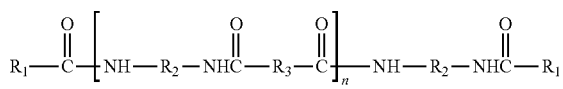

wherein $R_1$ is an alkyl group having at least seventeen carbons, $R_2$ includes a polyalkyleneoxide, $R_3$ includes a C-6 carbocyclic group, and n is an integer of at least 1, such as from 1 to about 100, from about 1 to about 50 and from about 5 to about 25.

The gellant may also comprise a curable polyamide-epoxy acrylate component and a polyamide component, such as disclosed, for example, in commonly assigned U.S. Patent Application Publication No. 2007/0120924, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are curable via free-radical initiation and enable chemical bonding of the gellant to the cured ink vehicle. A commercially available polyamide-epoxy acrylate is PHOTOMER® RM370 from Cognis. The curable polyamide-epoxy acrylate may also be selected from within the structures described above for the curable composite gellant comprised of a curable epoxy resin and a polyamide resin.

The ink composition may include the gellant in any suitable amount, such as about 1% to about 50% by weight of the composition. In embodiments, the gellant may be present in an amount of about 2% to about 20% by weight of the composition, such as about 3% to about 10% by weight of the composition.

Curable Wax

The ink composition may include at least one curable wax. The wax may be a solid at room temperature (25° C.). Inclusion of the wax may promote an increase in viscosity of the ink composition as the composition cools from the application temperature. Thus, the wax may also assist the gellant in avoiding bleeding of the composition through the substrate.

The curable wax may be any wax component that is miscible with the other components and that will polymerize with the isosorbide monomer functionalized with a functional group and/or the additional curable monomer to form a polymer. The term wax includes, for example, any of the various natural, modified natural, and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane, and the like. These waxes can be synthesized by the reaction of a wax, such as a polyethylene wax equipped with a carboxylic acid or hydroxyl transformable functional group. The curable waxes described herein may be cured with the above isosorbide monomer functionalized with at least one curable group and/or the additional curable monomer(s).

Suitable examples of hydroxyl-terminated polyethylene waxes that may be functionalized with a curable group include mixtures of carbon chains with the structure $CH_3-(CH_2)_n-CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN series of materials such as UNILIN 350, UNILIN 425, UNILIN 550 and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

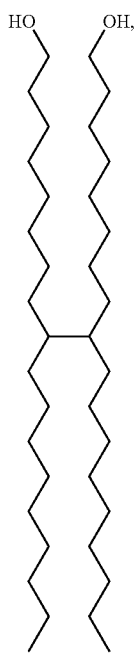 [SMILES: CCCCCCCCCC(CCCCCCCCO)C(CCCCCCCCC)CCCCCCCCO]
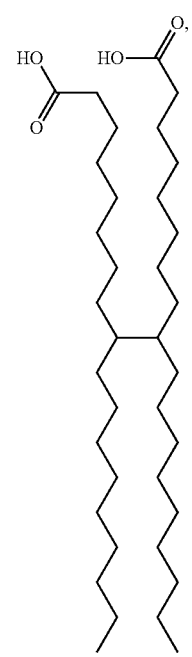 [SMILES: CCCCCCCCCC(CCCCCCCC(=O)O)C(CCCCCCCCC)CCCCCCCC(=O)O]

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3$—$(CH_2)_n$—COOH, where there is a mixture of chain lengths, n, where the average chain length is about 16 to about 50, and linear low molecular weight polyethylene, of similar average chain length. Suitable examples of such waxes include UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

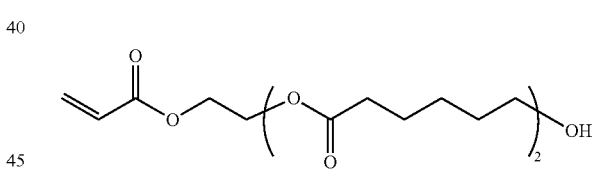

SR495B from Sartomer Company, Inc.;

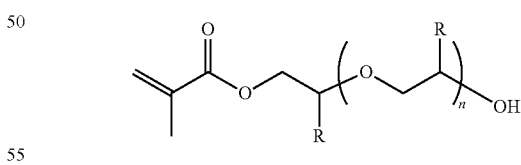

CD572 (R=H, n=10) and SR604 (R=Me, n=4) from Sartomer Company, Inc.

The curable wax can be included in the composition in an amount of from, for example, about 0.1% to about 30% by weight of the composition, such as from about 0.5% to about 20% or from about 0.5% to 15% by weight of the composition.

Optional Additives

The ink composition also contain additional materials including colorants, initiating agents, antioxidants, as well as any conventional optional additives. Such conventional additives may include, for example, defoamers, slip and leveling agents, pigment dispersants and the like. The inks may also include additional monomeric or polymeric materials as desired.

Colorants

The ink compositions may also contain a colorant. Any desired or effective colorant can be employed in the ink compositions, including dyes, pigments, mixtures thereof, and the like, provided that the colorant can be dissolved or dispersed in the ink vehicle. Pigments, which are typically cheaper and more robust than dyes, may be included in the curable phase change ink composition. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow D1 355, D1 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

The colorant may be included in the ink composition in an amount of from, for example, about 0.1 to about 15% by weight of the ink composition, such as about 2.0 to about 9% by weight of the ink composition.

Initiators

The curable phase change ink composition may optionally include an initiator, such as, for example, a photoinitiator. Such an initiator is desirable for assisting in curing of the ink.

In embodiments, a photoinitiator that absorbs radiation, for example UV light radiation, to initiate curing of the curable components of the ink may be used. As the photoinitiator for ink compositions that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-alkoxyalkylphenones α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as LUCIRIN TPO-L from BASF corporation); bis(2,4, 6-trimethylbenzoyl)-phenyl-phosphine oxide (available as IRGACURE 819 from BASF corporation) and other acyl phosphines; 2-methyl-1-(4-methylthio)phenyl-2-(4-morphorlinyl)-1-propanone (available as IRGACURE 907 from BASF corporation) and 1-(4-(2-hydroxyethoxy)phenyl)-2-hydroxy-2-methylpropan-1-one (available as IRGACURE 2959 from BASF corporation); 2-benzyl 2-dimethylamino 1-(4-morpholinophenyl) butanone-1 (available as IRGACURE 369 from BASF corporation); 2-hydroxy-1-(4-(4-(2-hydroxy-2-methylpropionyl)-benzyl)-phenyl)-2-methylpropan-1-one (available as IRGACURE 127 from BASF corporation); 2-dimethylamino-2-(4-methylbenzyl)-1-(4-morpholin-4-ylphenyl)-butanone (available as IRGACURE 379 from BASF corporation); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methy-1-(4-(1-methylvinyl)phenyl) propanone); 2-hydroxy-2-methyl-1-phenyl-1-propanone; benzyl-dimethylketal; and mixtures thereof. Mention may also be made of amine synergists, which are described as co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

The photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15% by weight, such as from about 1 to about 10% by weight, of the ink composition.

Antioxidants

The curable phase change ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from BASF corporation; GENORAD 16 and GENORAD 40 commercially available from Rahn AG, Zurich, Switzerland, and the like.

When present, the optional antioxidant is present in the ink compositions in any desired or effective amount, such as at least about 0.01% by weight of the ink composition, at least about 0.1% by weight of the ink composition, or at least about 1% by weight of the ink composition.

Ink Composition Preparation and Use

The curable phase change inks may be prepared by any suitable technique. As an example, the inks may be prepared by first combining the initiator components with the isosorbide monomer functionalized with at least one curable group and/or additional curable monomer(s), adding the specified amount of gellant, which may be less than 50% by weight or less than 15% by weight of the ink composition, optionally adding the specified amount of reactive wax which may be less than 50% by weight or less than 10% by weight, heating the mixture to obtain a single phase with low viscosity and thereafter adding this hot mixture slowly to a heated pigment dispersion (which may be a concentrate) while agitating the mixture. The ink composition may then be filtered, optionally at an elevated temperature, through a filter to remove extraneous particles. The method of preparation for the ink compositions may be modified so as to accommodate the type of reactive gelling agents used for the preparation of the ink compositions. For example, a concentrate of the gelling agent may be prepared in one of the components of the ink composition prior to the addition of the other components. Solutions containing co-gelling agents can also be prepared by a method similar to the one described above. Further examples of ink preparation methods are set forth in the Examples below.

The ink compositions may be employed in an apparatus for direct printing ink-jet processes, wherein when droplets of the melted ink are ejected in an imagewise pattern onto a recording substrate, the recording substrate is a final recording substrate. The recording substrate may be at any suitable temperature during recording. In embodiments, the recording substrate may be at room temperature. However, the substrate may be heated or cooled to have a surface temperature that is, for example, within the range of gel-phase transition temperatures for the ink composition. For example, the substrate may be maintained at a temperature of about 5° C. to about 160° C., such as from about 15° C. to about 50° C., or from about 20° C. to about 40° C. In this way, the jetted ink may be made to rapidly form a gel. Thus, the ink may be heated to a first temperature at which the ink may be jetted, for instance, above the gel-transition temperature of the ink composition, which first temperature may be, for example, from about 50° C. to about 100° C. The second temperature at which the gel forms is less than the first temperature, for example is from about 5° C. to about 75° C., as discussed above.

The ink compositions can also be employed in indirect (offset) printing ink jet applications, wherein when droplets of the melted ink are ejected in an imagewise pattern onto a recording substrate, the recording substrate is an intermediate-transfer member and the ink in the imagewise pattern is subsequently transferred from the intermediate-transfer member to a final recording substrate.

The ink compositions may be jetted onto an intermediate-transfer substrate, for instance, an intermediate-transfuse drum or belt. In a suitable design, the image may be applied by jetting appropriately colored ink compositions during, for instance, four to eighteen rotations (incremental movements) of the intermediate-transfuse member with respect to the ink jet head, in other words, there is a small translation of the printhead with respect to the substrate in between each rotation. This approach simplifies the printhead design, and the small movements ensure good droplet registration. Transfuse, or a transfer and fusing step, is desirable in forming the image as transfuse enables a high quality image to be built up on a rapidly rotating transfer member. Transfuse typically involves jetting the ink composition from the ink-jet head onto an intermediate-transfer member such as a belt or drum, such as the transfuse member. This allows the image to be rapidly built onto the transfuse member for subsequent transfer and fusing to an image-receiving substrate. Alternatively, the same image build-up can be carried out directly on the image substrate, for example, paper.

The intermediate-transfer member may take any suitable form, such as a drum or belt. The member surface may be at room temperature, although the member may be heated to have a surface temperature that is, for example, within the gel-state temperature range for the ink composition. For example, the surface may be maintained at a temperature of about 25° C. to about 100° C., such as from about 30° C. to about 70° C., or from about 30° C. to about 50° C. In this way, the jetted ink may be made to rapidly form a gel, which gel is maintained on the surface of the transfer member until transfer to the image-receiving substrate. Thus, the ink may be heated to a first temperature at which the ink may be jetted, for instance, above the gel-transition temperature of the ink composition, which first temperature may be, for example, from about 40° C. to about 100° C. The second temperature at which the gel forms is less than the first temperature, for example is from about 25° C. to about 100° C., as discussed above.

Once upon the intermediate-transfer member surface, the jetted ink composition may be exposed to radiation to a limited extent so as to affect a limited curing of the ink upon the intermediate-transfer member surface. This intermediate curing is not to cure the ink composition to its full extent, but merely to assist in setting the jetted ink so that it may be transferred to the image receiving substrate with the appropriate amount of penetration, which requires the ink droplets to have a certain rheology before transfer. For controlling the extent of the curing if an intermediate cure is practiced, reference is made to co-pending Application Publication Nos. 2006/0158496 and 2006/0119686, each incorporated herein by reference. This intermediate-curing step is not necessary in embodiments in which the gel state is sufficient to impart the desired rheology to the ink droplets.

Following jetting to the intermediate-transfer member and optional intermediate curing thereon, the ink composition is thereafter transferred to an image receiving substrate. The substrate may be any suitable material such as non-porous flexible food packaging substrates, adhesives for food packaging paper, foil-laminating, fabric, plastic, glass, metal, etc.

Following transfer to the substrate or jetting to the substrate if direct printing is employed, the ink composition is then cured by exposing the image on the substrate to radiation. For example, radiation having an appropriate wavelength, mainly the wavelength at which the ink initiator absorbs radiation, may be used. This initiates the curing reaction of the ink composition. The radiation exposure need not be long, and may occur for example, about 0.05 to about 10 seconds, such as from about 0.2 to about 2 seconds. These exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 ms$^{-1}$ would require 1 second for a point on an image to pass under a single unit, while a belt speed 4.0 ms$^{-1}$ would require 0.2 seconds to pass under four bulb assemblies. The energy source used to initiate crosslinking of the curable components of the composition can be actinic, for example, radiation having a wavelength in the ultraviolet or visible region of the spectrum, accelerated particles, for example, electron beam radiation, thermal, for example, heat or infrared radiation, or the like. The energy is actinic radiation because such energy provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like. The curing light may be filtered or focused, if desired or necessary. The curable components of the ink composition react to form a cured or cross-linked network of appropriate hardness and robustness. The curing is substantially complete to complete, at least 75% of the curable components are cured (reacted and/or cross-linked). This allows the ink composition to be substantially hardened, and thereby to be much more scratch resistant, and also adequately controls the amount of show-through on the substrate.

When an indirect-printing process is used, the intermediate-transfer member can be of any desired or suitable configuration, such as a drum or roller, a belt or web, a flat surface or platen, or the like. The temperature of the intermediate-transfer member can be controlled by any desired or suitable method, such as by situating heaters in or near the intermediate-transfer member, using air flow to cool the transfer member, or the like. Optionally, a layer of a sacrificial liquid can be applied to the intermediate-transfer member prior to ejecting the droplets of melted ink onto the intermediate-transfer member, whereby the melted ink droplets are ejected onto the sacrificial liquid layer on the intermediate-transfer member, as disclosed in, for example, U.S. Pat. No. 5,389,958. Transfer from the intermediate-transfer member to the final recording substrate can be made by any desired or suitable method, such as by passing the final recording substrate through a nip formed by the intermediate-transfer member and a back member, which can be of any desired or effective configuration, such as a drum or roller, a belt or web, a flat surface or platen, or the like. Transfer can be carried out at any desired or effective nip pressure, for example from about 5 pounds per square inch to about 2,000 pounds per square inch, such as from about 10 to about 200 pounds per square inch. The transfer surface may be hard or soft and compliant. Subsequent to transfer, the image on the substrate is cured. The radiation to cure the photo-polymerizable components of the ink composition may be provided by a variety of possible techniques, including but not limited to a xenon lamp, laser light, medium pressure mercury lamps, micro-wave excited mercury lamps often known as a H bulb, doped mercury lamps often referred to as D or V bulbs, LED etc. Without being limited to any specific theory, it is believed that the ink composition is transferred to the final recording substrate in a semi-solid state, facilitating penetration of the ink composition into the final substrate (paper fibers, for example) and enabling improved adhesion, reduced show-through, and reduced pile height.

The following examples of curable phase change ink compositions further illustrate the foregoing embodiments. These Examples are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

Examples

Preparation of Isosorbide Diacrylate (Acid Chloride Route)

25 grams (171 mmol) of isosorbide was added to a 1 L round-bottomed flask equipped with an overhead stirrer containing 500 mL of tetrahydrofuran (THF). The mixture was then stirred at room temperature to form a clear solution. 59.6 mL (428 mmol) was then added to the mixture. The resulting mixture was then cooled to 0° C. and stirred for 10 minutes. Next, 34.7 mL (428 mmol) of acryloyl chloride was placed in a 60 mL dropping funnel, and added dropwise to the cooled solution, which formed a white precipitate. The precipitated solution was slowly warmed to room temperature and allowed to stir overnight. The next day, the solvent was evaporated in vacuo, and the residue was washed with a 200 mL 5% HCl wash and two 200 mL ethyl acetate washes. The two ethyl acetate washes were combined, dried with $MgSO_4$, and the remaining solvent was removed in vacuo to form 11.81 grams of isosorbide diacrylate as a golden-colored, pungent viscous oil (46.5 mmol, 27.2% yield).

Preparation of Isosorbide Diacrylate (Acrylic Acid Route)

To a 2 L 3-neck round-bottomed flask (equipped with a stir bar, dropping funnel, and Dean-Stark trap), isosorbide (300 g, 2053 mmol), p-toluenesulfonic acid monohydrate (8.98 g, 47.2 mmol) and hydroquinone (4.52 g, 41.07 mmol). Next, toluene was added (Volume: 380 ml) and the reaction flask was purged with argon and heated to 90° C. Next, acrylic acid (564 ml, 8211 mmol) was charged into a 500 mL dropping funnel, and added dropwise to the heated solution over 1 h time. After addition of the acrylic acid was completed, the reaction was heated to 120° C. and held for 1 hour more. The reaction was cooled to room temperature, and the toluene solution was extracted with 3×300 mL portions of 20% NaOH solution, followed by brine. The toluene extract was dried with $MgSO_4$, and the solvent was removed in vacuo to furnish 129.57 g of isosorbide diacrylate (510 mmol, 24.83% yield).

Ink Composition Preparation

Four different ink formulations were prepared as described below in Table 1 and Table 2. Inks A and C were prepared on a 10 gram scale and Inks B and D were each prepared on a 600 gram scale. Each of these inks (Inks A-D) were prepared by combining all components of the ink vehicle, except the pigment dispersion, and mixing these components at 90° C. and 200 rpm for approximately 1 hour. After 1 hour, the pigment dispersion was added to each ink and the combined ink composition was stirred at 90° C. for an additional hour. All inks were fully miscible, giving clear solutions with a pourable viscosity at elevated temperatures and forming stiff gels when cooled to room temperature.

TABLE 1

Components of Inks A-D

| Component | Inks | | | |
|---|---|---|---|---|
| | A wt % of ink compostion | B (Comparative) wt % of ink compostion | C wt % of ink compostion | D (Comparative) wt % of ink compostion |
| Amide Gellant | 7.5% | 7.5% | 7.5% | 7.5% |
| Unilin 350-acrylate | 5% | 5% | 5% | 5% |
| Irgacure 127 | 3.5% | 3.5% | 3.5% | 3.5% |
| Irgacure 819 | 1% | 1% | 1% | 1% |
| Irgacure 379 | 3% | 3% | 3% | 3% |
| Irgastab UV 10 | 0.2% | 0.2% | 0.2% | 0.2% |
| 15 Weight Percent Cyan Pigment Dispersion/ SR9003 | 20% | 20% | — | — |
| 15 Weight Percent Black Pigment Dispersion/ SR9003 | — | — | 20% | 20% |
| Isosorbide Diacrylate (ISDA) | 54.8% | — | 54.8% | — |
| SR9003 | — | 54.8% | — | 54.8% |
| SR399LV (pentafunctional acrylate) | 5% | 5% | 5% | 5% |
| Total | 100% | 100% | 100% | 100% |

Adhesion and Offset Testing Results

Test samples of Inks A-D were printed on uncoated Mylar sheets using a K-printing proofer. These coated sheets were then sent through the heater+UV exposure station of a xerographic printing device (600 W Fusions UV Lighthammer curing lamp with a mercury D-bulb) at process speeds of 32 feet per minute (fpm), 90 fpm, 150 fpm and 230 fpm.

After the curing step the samples were tested for resistance to document offset and resistance to solvent via a procedure known as the MEK rub test as described by the ASTM D 5402-93 procedure available from the American Society for Testing and Materials (ASTM). The document offset tests places the test samples in an oven at 60° C. for 24 hours under an 80 $g/cm^2$ load. Images are then removed and peeled apart to determine if the ink is removed from the sample. A methyl ethyl ketone (MEK) rub test was also conducted on the cured images. The test consists of measuring the number of times a cotton swab that has been soaked in MEK solvent is rubbed across the image until the image is damaged. The MEK rub test is a semi-qualitative measurement of the robustness of ink prints, and a commonly used technique in the curable ink printing industry. The number of MEK rubs is only one of the measurements to determine the degree of cure of ink. However, if the ink was not removed after 150 rubs with the MEK, the test was stopped. The greater the number of MEK rubs, the greater the degree of cure. The MEK rub test results of Inks A-D are shown below in Table 1.

TABLE 2

MEK Rub Test Results of Inks A-D

| Ink | Amount of Isosorbide Diacrylate (wt. %) | Offset | MEK Rub Test at Process Speeds | | | |
|---|---|---|---|---|---|---|
| | | | 32 fpm | 90 fpm | 150 fpm | 230 fpm |
| A | 54.8 | No | >150 | | | |
| B | — | Yes | 100 | | | |
| C | 54.8 | No | >150 | >150 | >150 | >150 |
| D | — | Yes | 80 | 60 | 20 | 10 |

As shown above in Table 2, Inks A and D (containing isosorbide diacrylate monomer) exhibited significantly improved MEK rub resistance over Inks B and D, which contained only the SR9003 monomer.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A curable phase change ink composition, the ink composition comprising an ink vehicle comprising at least one isosorbide monomer having at least one functional group, wherein the at least one functional group is selected from the group consisting of an acrylate, a methacrylate, a fatty acid having from about 4 to about 20 carbon atoms, an epoxide and an oxetane.

2. The curable phase change ink composition of claim 1, wherein the at least one functional group is an acrylate.

3. The curable phase change ink composition of claim 1, wherein the at least one isosorbide monomer is functionalized with two acrylate groups.

4. The curable phase change ink composition of claim 1, wherein the at least one isosorbide monomer is represented the formula (I)

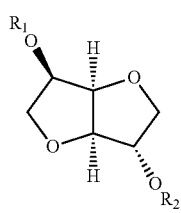

(I)

wherein $R_1$ represents a hydrogen atom or the at least one functional group, $R_2$ represents a hydrogen atom or the at least one functional group, and $R_1$ and $R_2$ are not both hydrogen atoms.

5. The curable phase change ink composition of claim 1, wherein the ink vehicle further comprises at least a gellant, at least a curable wax and optionally at least one photoinitiator.

6. The curable phase change ink composition of claim 5, having a gelling temperature of from about 30° C. to about 70° C.

7. The curable phase change ink composition of claim 1, having a jetting temperature of from about 60° C. to about 90° C.

8. The curable phase change ink composition of claim 1, further comprising at least one colorant.

9. The curable phase change ink composition of claim 8, wherein the at least one functional group is an acrylate.

10. The curable phase change ink composition of claim 8, wherein the at least one isosorbide monomer is represented the formula (I)

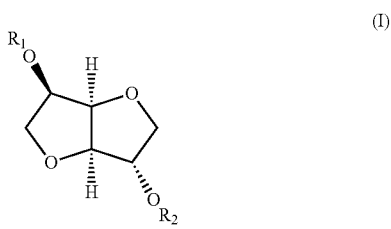

(I)

wherein $R_1$ represents a hydrogen atom or the at least one functional group, $R_2$ represents a hydrogen atom or the at least one functional group, and $R_1$ and $R_2$ are not both hydrogen atoms.

11. The curable phase change ink composition of claim 8, wherein the at least one isosorbide monomer comprises from about 40 weight percent to about 60 weight percent of the curable phase change ink composition, and wherein the curable phase change ink composition has a jetting temperature of from about 60° C. to about 90° C.

12. The curable phase change ink composition of claim 8, wherein the ink vehicle further comprises at least a gellant and at least a curable wax.

13. The curable phase change ink composition of claim 12, having a gelling temperature of from about 30° C. to about 70° C.

14. The curable phase change ink composition of claim 8, wherein the ink vehicle further comprises a curable monomer comprising from about 0.1 weight percent to about 30 weight percent of the curable phase change ink.

15. The curable phase change ink composition of claim 8, wherein the curable phase change ink composition is a radiation-curable phase change ink composition further comprising a photoinitiator.

16. The curable phase change ink composition of claim 8, having a jetting temperature of from about 60° C. to about 90° C.

17. The curable phase change ink composition of claim 1, wherein the curable phase change ink composition is a radiation-curable phase change ink composition further comprising a photoinitiator.

18. The curable phase change ink composition of claim 1, wherein the at least one functional group is selected from the group consisting of an acrylate, a methacrylate, a fatty acid having from about 4 to about 20 carbon atoms and an epoxide.

19. A curable phase change ink composition, the ink composition comprising an ink vehicle comprising at least one isosorbide monomer having at least one functional group, wherein the at least one functional group is selected from the group consisting of an acrylate, a methacrylate, a fatty acid having from about 4 to about 20 carbon atoms, an epoxide and an oxetane, wherein the at least one isosorbide monomer comprises from about 40 weight percent to about 60 weight percent of the curable phase change ink composition, and wherein the curable phase change ink composition has a jetting temperature of from about 60° C. to about 90° C.

* * * * *